United States Patent
Stevenson et al.

(10) Patent No.: US 8,241,734 B2
(45) Date of Patent: Aug. 14, 2012

(54) IN-MOLD INDICIA MARKING OF ROTATIONAL MOLDED PRODUCTS

(75) Inventors: Michael J. Stevenson, Sedona, AZ (US); Robert A. Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 804 days.

(21) Appl. No.: 11/521,259

(22) Filed: Sep. 13, 2006

(65) Prior Publication Data

US 2008/0063843 A1    Mar. 13, 2008

(51) Int. Cl.
*B32B 7/02* (2006.01)

(52) U.S. Cl. ..... 428/212; 428/40.1; 428/41.2; 428/42.1; 428/480; 428/542.2; 428/914

(58) Field of Classification Search .......... 428/40.1, 428/41.2, 42.1, 212, 480, 542.2, 914
See application file for complete search history.

(56) References Cited

U.S. PATENT DOCUMENTS

| | | | |
|---|---|---|---|
| 4,252,762 A | 2/1981 | Stevenson | |
| 4,466,994 A | 8/1984 | Hubbard et al. | |
| 4,519,972 A | 5/1985 | Stevenson | |
| 4,536,434 A | 8/1985 | Magnotta | |
| 4,731,401 A | 3/1988 | Moteki et al. | |
| 4,910,081 A | 3/1990 | Yamaguchi et al. | |
| 5,462,788 A | 10/1995 | Ohashi et al. | |
| 5,498,307 A | 3/1996 | Stevenson | |
| 5,611,881 A | 3/1997 | Kimura et al. | |
| 5,746,961 A | 5/1998 | Stevenson | |
| 5,840,142 A | 11/1998 | Stevenson | |
| 5,925,208 A | 7/1999 | Dronzek | |
| 6,159,568 A | 12/2000 | Freedman | |
| 6,991,261 B2 | 1/2006 | Dronzek | |
| 7,086,726 B2 | 8/2006 | Takashima et al. | |
| 7,156,940 B1* | 1/2007 | Stevenson et al. | 156/245 |
| 2009/0244146 A1 | 10/2009 | Chiwata | |
| 2009/0311426 A1 | 12/2009 | Nakazawa et al. | |

* cited by examiner

*Primary Examiner* — David R Sample
*Assistant Examiner* — Lawrence Ferguson
(74) *Attorney, Agent, or Firm* — Robert Strauss

(57) ABSTRACT

This invention comprises a self-supporting, temperature-stable, indicia-bearing laminate of at least one layer of a non-oriented polyolefin film having an indicia array and a layer of a non-oriented polyolefin support film. The indicia layer laminate is formed by printing a carrier sheet with at least one layer of a printing ink comprising a mixture of particulate polyolefin, indicia material and a polyolefin-compatible resin. The polyolefin support film is printed as a layer over the indicia layer with a mixture of a polyolefin and a polyolefin-compatible resin. The printed layers are cured into non-oriented films, forming an indicia transfer. The transfer is used by removing the indicia-bearing laminate from the carrier sheet and applying the laminate to the inside surface of a rotational mold where it melts and fuses into the outer wall of a polyolefin product during the formation of the product in the rotational molding cycle.

11 Claims, No Drawings

IN-MOLD INDICIA MARKING OF ROTATIONAL MOLDED PRODUCTS

BACKGROUND OF THE INVENTION

1. Field of Invention

This invention relates to a printing ink, an indicia-bearing laminated label for permanent fusion to polyolefin surfaces, and in particular to a method for in-mold indicia marking of rotationally molded products.

2. Background of the Invention

The application of indicia to polyolefin products has evolved from adhesive labels or overlays to in-mold applications, with each advance seeking greater ease of application and durability of the indicia on the products. Adhesive labels have never achieved permanent marking of polyolefin products, particularly polyethylene products, which have surfaces that resist coatings and adhesives.

An early attempt to achieve permanent marking of polyolefin products is described in U.S. Pat. No. 4,252,762 in which a transfer having an indicia array screen-printed with an oil suspension of polyethylene and pigments was applied to the interior surface of a rotational mold. During the molding cycle, the indicia array melted and fused into the rotationally molded product, resulting in the first successful, permanent fusion of indicia into the surface of a molded polyolefin product.

Successive improvements on in-mold fusion of indicia into rotationally molded polyolefin products concentrated on improvements of the indicia medium used for printing the transfer, e.g., U.S. Pat. No. 4,519,972 discloses use of pigmented wax printing media.

The transfer application technique was applied to indicia marking of preformed molded polyolefin products in U.S. Pat. No. 5,840,142. All of these attempts resulted in successful fusion of indicia into the outer surface of molded polyolefin products.

In-mold labeling of polyolefin products has also been the subject of patents in which adhesive labels are applied to the surfaces of molds used in blow molding processes, e.g., see U.S. Pat. Nos. 5,925,208 and 6,991,261. Because of the nature of blow molding process, the labels do not melt and fuse into the molded product, and must be adhesively bonded, resulting in a nonpermanent marking of the molded product.

It has been suggested in U.S. Pat. No. 5,498,307 that a label of indicia printed on extruded polyethylene film can be used for in-mold application to rotationally molded products. Labels printed on preformed polyolefin films, however, are invariably oriented such that the indicia array is distorted when the film is melted under the conditions of rotational molding.

OBJECTIVES OF THE INVENTION

It is an ultimate objective of this invention to provide permanent indicia marking of a molded polyolefin product.

It is a corollary objective to provide a printing ink with a vehicle that can be cured into a non-oriented film with a thermal shrinkage value which is the same, or substantially the same as the congeneric polyolefin.

It is an objective of this invention to provide a flexible, indicia-bearing laminate useful for in-mold application in thermoplastic molding processes.

It is also an objective of this invention to provide the flexible, indicia-bearing laminate as a self-supporting structure which can be directly applied to a hot mold surface.

It is likewise an objective of this invention to provide an indicia-bearing laminate of non-oriented films.

It is a further objective of this invention to provide an indicia-bearing laminate which will melt and fuse into the wall of a molded polyolefin product without distortion or migration of the array of indicia.

It is further an objective of this invention to provide a rotational molding process in which the flexible, indicia laminate of the invention is applied to an inside wall of a mold where it melts and fuses into a wall of a molded polyolefin product during formation of the product in the rotational molding process.

Other and related objectives will be apparent from the following description of this invention.

BRIEF DESCRIPTION OF THE INVENTION

This invention comprises a self-supporting, temperature-stable, indicia-bearing laminate of at least one layer of a non-oriented polyolefin film having an indicia array and a layer of a non-oriented polyolefin support film. The invention also comprises a polyolefin and resinous printing ink which comprises a mixture of particulate polyolefin, indicia material and a compatible resin and which is useful to form the laminate. The indicia layer laminate is formed by printing a carrier sheet with at least one layer of the printing ink. The polyolefin support film is printed as a layer over the indicia layer with a mixture of a polyolefin and a compatible resin. The printed layers are cured into non-oriented films, forming an indicia transfer. The transfer is used by removing the indicia-bearing laminate from the carrier sheet and applying it to the inside surface of a mold where it melts and fuses into the outer wall of a polyolefin product during the formation of the product in the mold.

DESCRIPTION OF PREFERRED EMBODIMENTS

The printing ink comprises a mixture of indicia material with a vehicle comprising a mixture of polyolefin particles and a polyolefin-compatible resin which can be cured into a non-oriented film. The vehicle mixture can have from 25 to 75 weight percent polyolefin particles and from 75 to 25 weight percent of the polyolefin-compatible resin preferably 40 to 60 weight percent polyolefin particles and 60 to 40 weight percent polyolefin-compatible resin. The ink can comprise from 5 to 35 weight percent indicia material and from 95 to 65 weight percent of the vehicle mixture; preferably 10 to 35 weight percent indicia material and from 90 to 65 weight percent of the vehicle mixture.

The indicia-bearing laminate of the invention is useful for fusion into the wall of a polyolefin molded product. The indicia-bearing laminate comprises at least one non-oriented film having an indicia array of alpha-numeric or graphic characters which is formed by printing a carrier sheet such as a plastic film, preferably a transparent film of polyester, with at least one layer of the printing ink of the invention. The laminate also has a support film formed by printing, over the indicia film, a layer of a support mixture of particulate polyolefin and a polyolefin-compatible resin such as previously described for the vehicle mixture of the printing ink Preferably, a background layer is also printed over the indicia-bearing layer, using, for example, a white printing ink. The layers are cured into non-oriented films which bond or fuse together into a laminate.

Suitable polyolefins which can be used in the printing ink and support mixture are those which are customarily used for thermoplastic molding. These are alpha-polyolefins, particularly alpha-hydrocarbon olefins, such as homopolymers of ethylene and propylene, or co-polymers with comonomers such as vinyl acetate, butylacrylate, etc. The polyolefin can be low, medium, high or ultra-high density and or molecular weight. Preferably the polyolefin used for the printing ink and for the support mixture is the same as, or is highly compatible with the polyolefin used to form the molded product in the molding process Since polyethylene is widely used and is notorious for forming products with surfaces which resist coatings and adhesives, this polyolefin is most preferred. When polypropylene is used as the molding resin, polypropylene is preferably selected for use in the layers of the indicia-bearing laminate. Similarly polyethylene-vinyl acetate is selected for use when polyethylene-vinyl acetate is the molding resin.

The particle size of the particulate polyolefin can be varied, as needed for the desired resolution of the printed indicia array. In the preferred screen printing method, particle sizes from 10 to 20 microns are useful for printing of high resolution with screens having mesh sizes from 100 to 325 mesh, as described hereinafter. If high resolution of the indicia array is not an objective, coarser particles can be used, e.g., particles having diameters up to 250 microns can be used.

Useful indicia material for the printing ink can be colorants such as pigments and dyes as well as metal particles in flake or ball shape. Useful colorants include those containing inorganic pigments such as titanium dioxides (rutile analase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide or cadmium sulfoselenides, nickel and titanium dioxide mixtures, sodium, potassium or ammonium coordination compounds of ferri-ferrocyanide, ultramarine blues (a calcined mixture of china clay, sodium carbonate, silica, sulfur and reducing agents), cobalt aluminate (cobalt blues), chromium oxide, metal flake pigments such as aluminum zinc copper borate powders, metal silver pigments, pearlescent and iridescent flakes of basic lead carbonates, bismuth oxychiorides and titanium coated mica, etc. Various organic pigments which are useful include azo pigments such as benzimidazolone pigments, pyrazolorie pigments, copper phthalocyanine quinacridones, anthraquinones, condensations pigments, tetrachloro-isoindolinones, carbon blacks, etc.

Polyolefin-compatible resins which are useful in the printing ink and the support mixture can be selected from the various resins which have been used as vehicles in printing inks. Examples of such resins are derivatives of gum, tall oil and wood rosins which have been purified by fractionation of the crude rosins and modified, such as phenol modified rosin derivatives, maleic modified rosin derivatives, dimerized rosin, hydrogenated rosins, etc. Other useful resins are C5-C9 hydrocarbon aliphatic, alicyclic and aromatic resins, cyclopentadiene resins, styrene resins, etc. Also useful are acrylic/styrene resins, terpene resins, acrylic and polyamide resins. Suitable resins are thermoplastic and miscible in the molten state with the polyolefin, and as defined herein are polyolefin-compatible resins. Preferably, the polyolefin-compatible resin has limited unsaturate content for optimum stability and excellent color, e.g., a color from white to lily white to avoid discoloration of the indicia. Resins which have a softening point from ambient temperature to about 250° F. are preferred.

The printing inks and the support mixture are liquid at the printing temperature which can be from ambient temperature up to about 220° F. If necessary to obtain liquids which are suitable for printing, the printing inks and the support mixture can be suspended or dissolved in suitable liquids, such as organic solvents or water. Useful solvents include toluene, xylene, methyl ethyl ketone, naphtha, mineral oil spirits, isopropanol, etc.

Water can be used with from 1 to 5 weight percent surfactant to form stable aqueous suspensions suitable for printing. Examples of useful surfactants are non-ionic such as ethylene oxide condensates of vegetable oils, alcohols, phenols, etc. for aqueous mixtures. Other non-ionic surfactants include polyethylene aliphatic ethers such as polyoxyethylene lauryl ether, polyoxyethylene hydroabietyl ether and the like, polyoxyethylene esters of higher fatty acids such as polyoxyethylene laurate, polyoxyethylene oleate; and condensates of ethylene oxide with resin acids and tall oil acids. Ionic surfactants can also be used such as anionic compounds obtained by sulfonation of fatty derivatives such as sulfonated tallow, sulfonated vegetable oils an sulfonated marine animal oils. Various sulfonated and sulfated fatty acid esters of mono- and polyvalent alcohols are also suitable such as a sulfated butyl ester of a fatty ester, sulfated fatty esters, etc.

Various printing methods can be used such as gravure printing with etched or engraved chrome-plated or copper rolls; flexography printing with a flexible printing plate; and screen printing. The preferred method is screen printing with metal screens that bear photographically-prepared stencils for each color of a multi-color indicia array. Each color can be printed in a single application. Alternatively, two or more stencils can be placed in butt registration, permitting the printing of two or more colors in a single application. Usually, a background layer will be printed over the indicia array layer, using an indicium material selected for the background, e.g., titanium dioxide powder can be used for a white background. The indicia-bearing layers are printed at a density to provide layers having a thickness from 0.5 to about 2 mils, preferably about 1 mil.

For the preferred screen printing method, temperatures from ambient to about 220° F. are useful printing temperatures, and for optimum screen printing the ink and support layer mixtures should have a viscosity from about 10,000 to 20,000 centipoise seconds at the printing temperature. In applications where the ink or the support mixture is liquid at the printing temperature and has the requisite viscosity, no additional liquid carrier is necessary.

Various additives can be used for adjusting the viscosity of the mixtures. As previously mentioned, a liquid carrier such as a solvent or water can be used when the mixture is too viscous or is a solid at the printing temperature. If the ink or support mixture lacks adequate viscosity, fumed silica can be added as a thickener and a limited amount, such as 0.1 to 2.5 weight percent, petroleum wax can be added to decrease the viscosity of the mixture.

Additional additives which can be added to the ink or support mixtures include fillers which will control or reduce the shrinkage of the printed layers during curing. Examples of suitable fillers which can be used in concentrations from 2 to 20 weight percent include glass beads, talc, calcium carbonate in particle sizes of 50 microns or less.

When the printing inks are liquid at temperatures from ambient to about 225° F., it is preferred to cure each ink application prior to printing of the next succeeding application. The inks can be cured by ultraviolet radiation, catalytic curing, or thermal curing. It is preferred to use thermal curing by heating the printed layer to the melting temperature of the polyolefin particles used in the ink. For the preferred ink which is a mixture of an indicium material, particles of polyethylene and a polyethylene-compatible resin, the curing temperature is from 250° F. to 300° F. This curing can be conveniently conducted in an oven for a short period of time, e.g., from 30 seconds to several minutes, sufficient to fuse the printed indicia into a non-oriented film. Thereafter, the cured application is printed with the next, succeeding application.

The laminate also requires a support film which imparts structural strength sufficient to permit the laminate to be stripped from the carrier sheet and applied to the surface of a mold or a preformed polyolefin product. For this purpose, a final support layer of a mixture of particulate polyolefin and polyolefin-compatible resin is overprinted on the indicia layers. Preferably, the same polyolefin which is used for the ink vehicle is also used in the support mixture for printing the support layer. This support layer is printed at sufficient thickness to impart strength and integrity to the printed layers, typically at a thickness from 2 to about 3 mils. The printed support layer is then cured in an oven at the melt temperature of the polyolefin to fuse the particles of polyolefin into a contiguous, non-oriented film which fuses into the previously printed indicia layers, forming an integral laminate.

It is preferred to include a background layer into the laminate. This can be achieved by incorporating an indicia material, such as titanium oxide, in the support mixture. Since this reduces the strength of the support layer, it is preferred to print a background layer over the last indicia-bearing layer using a printing ink containing the selected background colorant and then overprint the background layer with the clear, support mixture.

The resulting transfer comprises a laminate of indicia-bearing, non-oriented films and a non-oriented support film. The laminate has a thickness from 4 to about 6 mils on a carrier sheet. In use, the laminate can be readily peeled from the carrier sheet and transferred to the interior surface of a rotational mold for in-mold printing of a polyolefin product. Alternatively, the laminate can be applied to the surface of a preformed polyolefin product and the surface and laminate can be heated to the melting temperature of the polyolefin to fuse the laminate into the wall of the product.

The laminate transfer can be used for imparting indicia to products formed by various conventional molding processes such as rotational molding and compression molding, The laminate is preferably used for in-mold application in a rotational molding process. In this process, a two-part mold is usually used. The molding resin used in conventional rotational molding is particulate, with sizes from 16 to about 60 mesh, e.g., 35 mesh. The predominantly used resin is polyethylene. The molding resin is poured into the mold, the mold is closed and heated to a molding temperature such as 350° F. to 500° F. while rotating the mold about its major and minor axes for sufficient time, typically from 10 to about 30 minutes. As the mold is heated and rotated, the molding resin particles are tumbled against the hot interior walls of the mold, where they melt and fuse together on the interior walls of the mold, forming a hollow-form molded product. Thereafter, the mold is cooled to a demolding temperature, usually 90° F. to about 150° F., the mold is opened and the molded product is ejected.

In this process, the indicia bearing laminate of the invention is peeled from the carrier sheet and is pressed against a selected area of the interior walls of the mold, which are usually at the demolding temperature. Adhesion of the laminate to the mold surface can be enhanced by the application of a heat sensitive pressure sensitive adhesive. The adhesive can be sprayed onto the surface of the mold prior to application of the indicia laminate. Examples of suitable adhesives are polyterpenes, rosin esters, coumarone-indene resins, etc. in a suitable solvent such as mineral spirits to form a composition suitable for spraying.

Alternatively, the adhesive can be printed as a layer in the laminate. In this application, the order of printing the layers is reversed. The support layer is first printed on the carrier sheet. If a background color is not included in the support layer, then a background layer is printed, using a background color printing ink, over the support layer, followed by one or more indicia layers, and finally the adhesive layer is printed over the last indicia layer. As previously described, when any of the printed layers is too soft for overprinting, the layer is cured, preferably thermally, before the next layer is printed.

After the indicia bearing laminate is secured to a selected area on the inside wall of the mold, the steps of the conventional molding cycle are conducted, and when completed, a molded product having the indicia-bearing laminate fused into a selected area of its wall. During the molding cycle, the laminate melts and fuses into the wall of the molded product becoming integral with the molded part.

The laminate can also be used in compression molding which is used to form large panel structures. In this process, pellets or sheets of a thermoplastic polyolefin are charged to a mold consisting of heated platens which are compressed together to shape the pellets or sheets to conform to the mold shape by the applied pressure, usually 10-20 bars and temperatures from 100° C. to 150° C. Typically, the molding resin is long fiber reinforced thermoplastics (LFRT) or ultrahigh molecular weight polyethylene (UHMWPE). This process is also used to form shaped products from preformed blanks of polyolefin foam, such as cross-linked polyethylene foam. In these applications, the indicia-bearing laminate of the invention is peeled from the carrier sheet and is pressed against a selected area of the inside wall of the compression mold, using an adhesive as required to retain the laminate on the wall of the compression mold. The mold is closed, heated and compressed to the compression molding conditions to shape the molding resin to the intaglio pattern of the interior of the mold, and the laminate melts and fuses into the surface of the molded product.

Alternatively, the indicia bearing laminate of the invention can be applied to a preformed polyolefin object. In this method, the laminate is peeled from the carrier sheet and is pressed against a selected area of the outer surface of the preformed object. The laminate and the underlying surface of the polyolefin object are then heated to their melt temperature of the polyolefin for a brief interval, e.g, from about 10 to 60 seconds, to fuse the laminate into the surface of the polyolefin object, without distorting the object. The heating can be accomplished by various methods; however, infra-red radiation is preferred.

The invention will be described in the following examples, which also serve to demonstrate results obtained with the invention.

EXAMPLE 1

An indicia bearing laminate is prepared by screen printing an indicia array onto a polyester film having a thickness of 3 mils which is coated with a silicone release agent. The indicia form an alpha-numeric and graphic array of a manufacturer's trade name and logo in a black outlined, white letters and a white and blue logo. The first layer of the indicia array is printed using a screen with butt registered stencils of blue and black color arrays. The blue ink comprises a mixture of 25 weight percent polyethylene particles with a particle size of about 20 microns, 50 weight percent hydrocarbon resin and 25 weight percent thallocyanide blue pigment. The black ink comprises a mixture of 30 weight percent high density polyethylene particles, also with a particle size of 20 microns, 60 weight percent hydrocarbon resin and 10 weight percent carbon black. These mixtures are screen printed at a temperature of 120° F. to form a layer 2 mils thick, and the printed layer is cured at 250° F. for a period of 1 to 2 minutes. A second indicia layer is printed over the cured film from the first printing using a screen with a white printing ink comprising 25 weight percent high density polyethylene, 50 weight percent hydrocarbon resin and 25 weight percent titanium dioxide. This mixture is also printed at 120° F., forming a layer 2 mils thick which is cured at 250° F. for 1-2 minutes. A clear support mixture comprising 50 weight percent polyethylene and 50 weight percent hydrocarbon resin is then screen printed at 120° F. over the indicia-bearing films and cured at 250° F., forming a non-oriented support film which is approximately 2.5 mils thick. The resultant transfer comprises an integral laminate approximately 5 mils thick deposited on the polyester film.

EXAMPLE 2

The transfer prepared in Example 2 is used as an in-mold label during the rotation molding of a kayak. In this application, an adhesive of 50 weight percent hydrocarbon resin in 50 weight percent mineral spirits is sprayed against a selected interior surface of the rotational mold, and the indicia-bearing laminate is peeled from the polyester carrier sheet and the laminate is applied, against the adhesive coated inside wall of the rotational mold, with the printed indicia layer of the laminate in direct contact with the wall of the mold. The mold is at a typical demolding temperature of 120° F. The mold is charged with 35 mesh polyethylene the molding resin, closed and heated to a temperature of 400° F. while rotating the mold about its major and minor axes for 35 minutes. The mold is then cooled, opened and a hollow form, molded kayak product having the indicia permanent fused into its outside wall is removed.

EXAMPLE 3

An indicia-bearing laminate prepared in the manner described in Example 1 is used to permanently mark a crosslinked molded polyethylene foam product. A foam blank having a thickness of ¾ inch is placed in a compression mold, a selected face of which is coated with an adhesive as described in Example 2. The indicia-bearing laminate is stripped from the carrier sheet and placed with its printed face against the adhesive-coated face of the mold. The mold is closed and heated to a temperature of 300° F. while compressing the mold to a pressure of 20 bars for 10 minutes. The mold is cooled and the pressure on the mold is removed, the mold is opened and a molded foam product having a permanently fused indicia array on its outer surface is removed from the mold.

EXAMPLE 4

A preformed polyethylene product is permanently decorated with an indicia prepared in the manner described in Example 1. In this application, an adhesive is applied to a selected area of the product. The indicia-bearing laminate is stripped from the carrier sheet and is placed, printed side down, against the adhesive-coated surface of the product. An infrared heating gun is then directed against the laminate and the underlying surface of the polyethylene product to heat the laminate and surface to a temperature of 250° F. for 10 seconds, sufficiently to melt the mated surfaces to the melt temperature of polyethylene and fuse the laminate into the wall of the product.

The laminate is formed of non-oriented, multiple polyolefin films. This provides a temperature stable array of indicia since the laminate can be heated to its melting point without shrinkage and distortion of the indicia array during the fusion of the laminate into the surface of the polyolefin product.

Since the laminate is essentially formed of a polyolefin and polyolefin-compatible resin, it does not adulterate the polyolefin product and the used product can be readily recycled without the need to remove labels formed of incompatible materials.

The printing ink of the invention can also be used for printing on polyolefin films and sheets formed or coated with polyolefins, such as polyethylene The invention has been described with reference to the illustrated and presently preferred embodiment. It is not intended that the invention be unduly limited by this disclosure of the presently preferred embodiment. Instead, it is intended that the invention be defined, by the means, steps, and their obvious equivalents, set forth in the following claims:

What is claimed is:
1. A graphics transfer comprising:
a. a carrier sheet;
b. a flexible, self-supporting, temperature-stable, indicia-bearing laminate of at least one indicia layer printed onto said carrier sheet with an ink having from 5 to 35 weight percent of an indicia material in a vehicle mixture comprising from 25 to 75 weight percent of a particulate polyolefin and 75 to 25 weight percent of a polyolefin-compatible resin; and
c. a support layer of a non-oriented polyolefin film printed with a vehicle mixture comprising from 25 to 75 weight percent of a particulate polyolefin and 75 to 25 weight percent of a polyolefin-compatible resin;
wherein said indicia and support layers are fused together to form said indicia-bearing laminate.

2. The graphics transfer of claim 1 wherein said particulate polyolefin is particulate polyethylene and said polyolefin-compatible resin is a polyethylene-compatible resin.

3. The graphics transfer of claim 2 wherein said carrier sheet is a transparent plastic film.

4. The graphics transfer of claim 3 wherein said plastic film is a polyester film.

5. The graphics transfer of claim 2 wherein said laminate has successive indicia-bearing layers.

6. The graphics transfer of claim 5 wherein each of said indicia layers is prepared by printing an indicia array with an ink having from 10 to 30 weight percent of an indicia material in a vehicle mixture comprising from 25 to 75 weight percent of particulate polyethylene and 75 to 25 weight percent of a polyethylene-compatible resin.

7. The graphics transfer of claim 1 wherein each layer of said indicia and support layers is cured by heating each layer to 250° to 300° F. to cure said each layer prior to printing of the next successive layer.

8. The graphics transfer of claim 6 wherein said indicia and support layers are prepared by screen printing.

9. The graphics transfer of claim 6 wherein said vehicle mixture comprises from 40 to 60 weight percent of said particulate polyethylene and from 60 to 40 weight percent of said polyethylene-compatible resin.

10. The graphics transfer of claim 1 wherein said vehicle mixture comprises from 40 to 60 weight percent of said particulate polyolefin and from 60 to 40 weight percent of said polyolefin-compatible resin.

11. The graphics transfer of claim 1 wherein said polyolefin-compatible resin is selected from the class of crude and modified-derivatives of gum, tall oil and wood rosins, C5-C9 hydrocarbon aliphatic, alicyclic and aromatic resins, cyclopentadiene resins, styrene resins, acrylic/styrene resins, terpene resins, and acrylic and polyamide resins.

* * * * *